April 18, 1933. W. L. DYSART 1,903,917
ANTIGLARE DEVICE
Filed Aug. 17, 1931
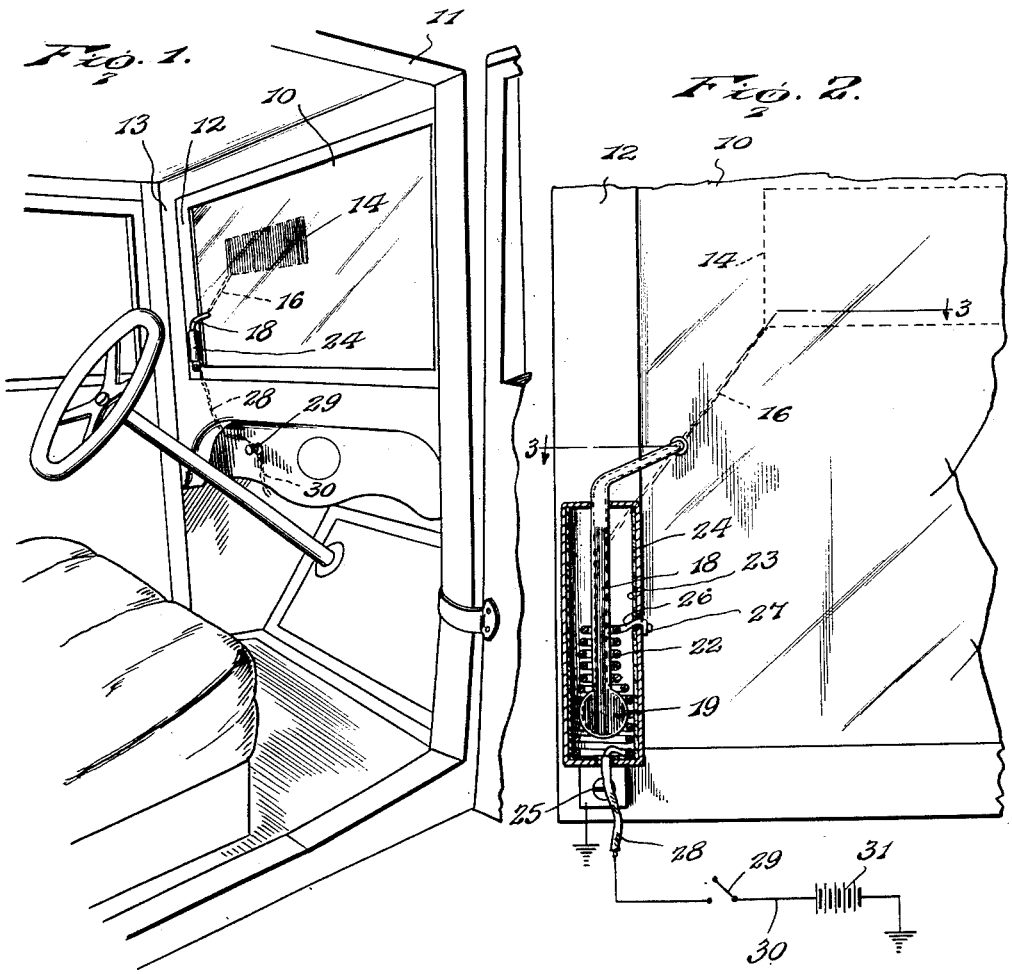
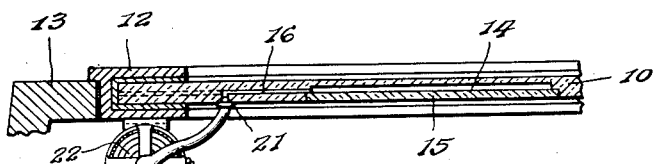
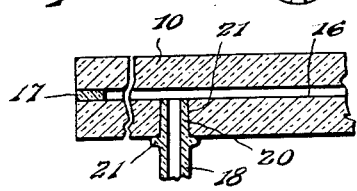
Inventor
W. L. Dysart.
By Lacey & Lacey,
Attorneys Patented Apr. 18, 1933

1,903,917

UNITED STATES PATENT OFFICE

WILLIAM L. DYSART, OF LOUISVILLE, KENTUCKY

ANTIGLARE DEVICE

Application filed August 17, 1931. Serial No. 557,665.

This invention relates to anti-glare shields for automobiles and other purposes.

An object of the invention is to provide an anti-glare shield which may be operated at the will of the driver to color an area of the windshield in the line of his vision to obviate the effects of strong lights, such as glaring headlights, sun, snow glare and the like, to the end that safe driving will be promoted both by day and by night.

A further object is to provide a device which, in addition to coloring an area in the driver's line of vision, will heat said area to cause ice or snow to melt throughout that area so that safety in driving will be further promoted.

A further object is to provide an anti-glare and heating device which may be built into new windshields or may be readily applied to used windshields without extensive alterations.

A still further object is to provide a device of the character described which may be formed of a few inexpensive parts which will not easily get out of order and which can be manufactured at minimum cost.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a perspective view of the device applied to a windshield,

Fig. 2 is an enlarged fragmentary elevation with parts in section and showing the electrical connections diagrammatically, Fig. 3 is an enlarged cross sectional view taken on the line 3—3 of Fig. 2, and Fig. 4 is an enlarged detail sectional view showing the method of attaching the device to the windshield.

Referring now to the drawing in which like characters of reference designate similar parts in the various views, 10 designates the windshield of an automobile 11, the windshield being, as usual, formed of glass, and being confined at the edges in the usual metal sash 12 fitted in the usual manner to the sash frame 13.

In carrying out the invention, I preferably provide a chamber 14 in the windshield, which chamber may be of any size and shape and is located, as best shown in Fig. 1, in the line of vision of the driver. In the preferred embodiment of the invention as applied to a windshield during manufacture of the windshield, the chamber 14 may be built into the glass substantially midway between the front and rear surfaces thereof, for instance, by molding a recess in the glass and providing a closure glass plate 15 for the recess and securing the closure plate by any preferred cement, such as, for instance, Canada Balsam, which is transparent and invisible. The depth of the chamber is preferably that of a sheet of thin paper. A duct 16 is also formed in the glass windshield preferably to communicate with the chamber at one lower corner thereof and to open through the edge of the windshield, as best shown in Fig. 4, to simplify manufacture, the open end of the duct being preferably closed by a plug 17 of any suitable material and cemented or otherwise secured in place in any preferred manner.

Although I have described in detail the manufacture of one embodiment of the glass windshield, it will be understood that the chamber 14 and duct 16 may be built into the windshield in other ways than that above described, and, for instance, when the invention is to be applied to a used windshield, the chamber and duct may be formed by the application of a single sheet of glass to the windshield, cemented or otherwise secured thereto, it being simply necessary to the carrying out of the invention that there be provided on the windshield a chamber which will be leak-proof and situated within the line of vision of the driver.

In further carrying out the invention, I provide a tube 18 for the reception of mercury, for instance, although other liquid may be utilized. Alcohol has been found in practice to work well, and if alcohol is used it may be given any desired color. The tube 18 may be a plain tube or may be formed at the bottom with a bulb 19, similar to that of a mercury thermometer. The top of the tube is directed laterally to enter the above-described duct 16, and, as best shown in Fig. 4, the tube may be provided at the extremity with a tapered nozzle 20 and a stop shoulder 21 in rear of the nozzle, the nozzle being directed into an opening 21' formed in the windshield to communicate with the duct 16. The nozzle may be secured in the opening 21' in the windshield by cement or any other preferred medium.

In further carrying out the invention, I provide a heating coil 22 which surrounds the tube 18 and bulb 19. A suitable casing 23 of insulating material surrounds the heating coil and mounts the same on the tube, and this casing is preferably enclosed in an outer casing 24 preferably formed of metal and which may be secured to the metal frame of the windshield by a screw 25 or otherwise.

One end of the heating coil is grounded on the metal casing by means of a wire 26 which is led through openings in the insulating casing and in the outer casing and terminally secured to the outer casing by means of a screw 27 or otherwise. The opposite end of the heating coil is connected by a conductor wire 28 to a switch 29 of any preferred type, preferably situated within convenient reach of the driver on the instrument board, the switch being connected by a wire 30 to the storage battery 31 of the automobile. The wire 28 is preferably led through suitable openings formed in the insulating casing and in the outer casing at the bottom of both casings and is preferably provided with sufficient slack to permit of the windshield being moved open and closed without disturbing the various parts of the device.

In operation, the driver may, at will, close the switch 29 to heat the coil 22 and heat the mercury or other liquid in the tube 18. The resultant expansion of the mercury fills the chamber 14 so that the area of the chamber is simultaneously given the color of mercury or other liquid and heated. Coloring of the chamber will, of course, minimize, if not entirely destroy, the glaring effects of strong lights, such as approaching headlights, or the glare of a late afternoon sun, or the glare from snow. Heating of the chamber, of course, causes snow and sleet to melt throughout the area of the chamber so that safe driving both by day and by night, as well as during snow and sleet storms, will be promoted.

The preferred color of the expansible liquid in the tube is green or amber for the sake of relieving eyestrain, although other colors may equally well be employed to practice the invention. While mercury and alcohol have been specifically mentioned, it is not intended to limit the invention to their use, since any other expansible liquid of suitable characteristics may be utilized. While I have described a single specific embodiment of the invention, it is to be understood that I do not limit myself to the specific construction described, as modifications may be resorted to in the manufacture of new windshields or in applying the device to used windshields, so long as a windshield is provided with a chamber adapted to be filled with a heated colored liquid at the will of the driver.

Having thus described the invention, I claim:

1. In an anti-glare device for automobiles, a windshield having an internal chamber and a filling duct for the chamber, a tube of expansible liquid, a conduit leading from the tube to the duct, an electric heating coil surrounding the tube, a housing for insulating the tube and coil, a metal casing surrounding the housing, means for securing the casing stationary adjacent the windshield, a source of electricity, and circuit wires connecting the coil with the source of electricity.

2. In an anti-glare device for automobiles, a windshield having a leak-tight chamber provided with a filling duct, a tube of colored expansible fluid communicating with said duct, an electric heating coil surrounding the tube and adapted to expand the liquid therefrom into the chamber, insulating means for mounting the tube stationary, a source of electricity, and conductor wires connecting the coil with the source of electricity.

3. The combination of a windshield having a leak proof chambered pane, a tube of expansible colored liquid, and means for heating and expanding the liquid from the tube into the chamber of the pane, comprising, an electric heating coil surrounding the tube, a source of electricity, conductor wires connecting the source of electricity with the coil, and insulating means for mounting the coil and tube stationary adjacent the windshield.

In testimony whereof I affix my signature.

WILLIAM L. DYSART. [L. S.]